United States Patent
Hinderer et al.

(10) Patent No.: US 9,791,887 B2
(45) Date of Patent: Oct. 17, 2017

(54) SYNCHRONIZATION OF A DATA SIGNAL

(71) Applicant: Infineon Technologies AG, Neubiberg (DE)

(72) Inventors: Thorsten Hinderer, Unterhaching (DE); Markus Hopfner, Rosenheim (DE)

(73) Assignee: Infineon Technologies AG, Neubiberg (DE)

( * ) Notice: Subject to any disclaimer, the term of this patent is extended or adjusted under 35 U.S.C. 154(b) by 432 days.

(21) Appl. No.: 14/142,161

(22) Filed: Dec. 27, 2013

(65) Prior Publication Data
US 2015/0185759 A1 Jul. 2, 2015

(51) Int. Cl.
| | | |
|---|---|---|
| G06F 1/04 | (2006.01) | |
| G06F 1/06 | (2006.01) | |
| G06F 1/12 | (2006.01) | |
| G06F 13/42 | (2006.01) | |

(52) U.S. Cl.
CPC .......... *G06F 1/04* (2013.01); *G06F 1/06* (2013.01); *G06F 1/12* (2013.01); *G06F 13/42* (2013.01); *G06F 13/423* (2013.01)

(58) Field of Classification Search
CPC ............... G06F 1/04; G06F 1/06; G06F 1/12
See application file for complete search history.

(56) References Cited

U.S. PATENT DOCUMENTS

| | | | |
|---|---|---|---|
| 6,285,726 B1 | 9/2001 | Gaudet | |
| 2003/0067937 A1* | 4/2003 | Kim | H04L 12/40013 370/438 |
| 2006/0274597 A1* | 12/2006 | Lin | G11C 7/20 365/189.07 |
| 2008/0276107 A1* | 11/2008 | Bogavac | H04L 12/12 713/323 |
| 2009/0267661 A1* | 10/2009 | Ootsuki | H03L 7/14 327/156 |
| 2014/0118040 A1* | 5/2014 | Nakayama | H03L 7/0816 327/157 |

FOREIGN PATENT DOCUMENTS

DE 19922807 A1 11/1999

OTHER PUBLICATIONS

International Standard, Norm, "Road Vehicles—Controller Area Network (CAN)—Part 6: High Speed Medium Access Unit with Selective Wake-Up Functionality," ISO 11898-6 First Edition, Nov. 1, 2013, 19 pages.

* cited by examiner

*Primary Examiner* — Stefan Stoynov
(74) *Attorney, Agent, or Firm* — Slater Matsil, LLP

(57) ABSTRACT

A method for synchronizing a data signal in a bus environment is suggested, the method may include providing multiple clock phases based on a reference oscillator; determining a phase out of the multiple clock phases for a transition of a data signal; and synchronizing the data signal based on the phase determined.

17 Claims, 2 Drawing Sheets

SYNCHRONIZATION OF A DATA SIGNAL

BACKGROUND

Embodiments relate to synchronization of a data signal, in particular a piece of a data stream, e.g., a symbol, in a bus environment, e.g., a CAN environment. The bus environment may be a differential bus environment or a single wire system using non-return-to-zero (NRZ) data.

SUMMARY

A first embodiment relates to a method for synchronizing a data signal in a bus environment, the method comprising the steps:
- providing multiple clock phases based on a reference oscillator;
- determining a phase out of the multiple clock phases for a transition of a data signal;
- synchronizing the data signal based on the phase determined.

A second embodiment relates to a device comprising a processing unit that is arranged for
- providing multiple clock phases based on a reference oscillator;
- determining a phase out of the multiple clock phases for a transition of a data signal;
- synchronizing the data signal based on the phase determined.

A third embodiment relates to a system comprising
- means for providing multiple clock phases based on a reference oscillator;
- means for determining a phase out of the multiple clock phases for a transition of a data signal;
- means for synchronizing the data signal based on the phase determined.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
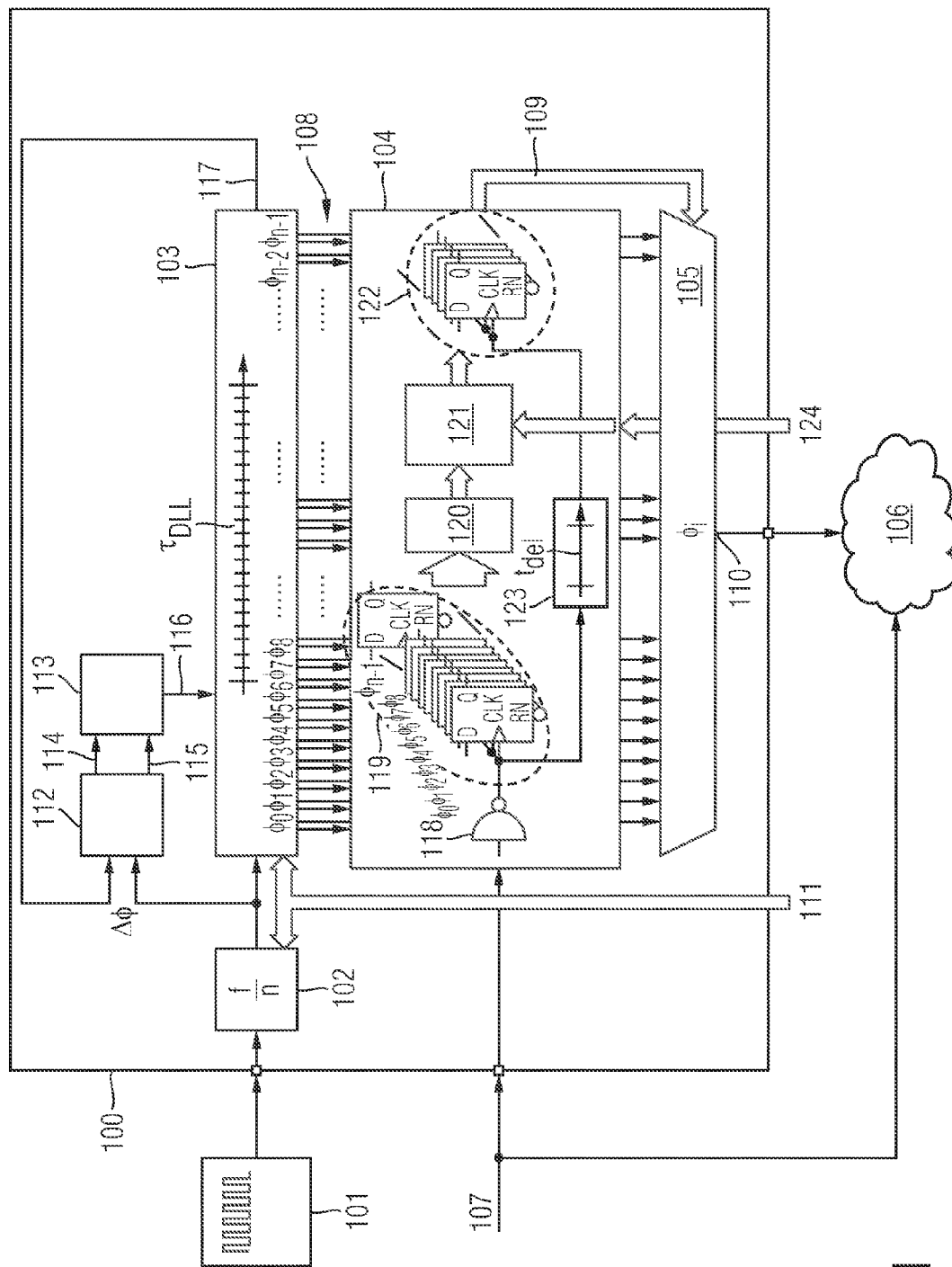
FIG. 1 shows a block diagram of a circuitry that may be used for symbol synchronization in a CAN selective wake environment.

The examples in particular refer to differential data-bus environments, e.g., networks, in which differential mode data may be used for data transmission purposes. An exemplary differential bus system utilizes the FlexRay protocol. For details on the FlexRay protocol. Another example is a CAN bus.

A CAN bus (CAN: controller area network) is a vehicle bus standard designed to allow microcontrollers and devices to communicate with each other within a vehicle without a host computer. The CAN bus is a message-based protocol, designed specifically for automotive applications, but could also be used in other areas such as aerospace, maritime, industrial automation and medical equipment.

In the CAN protocol the symbol synchronization takes place at a recessive to dominant transition (also referred to as RD transition) of a CAN data stream received.

Further, the CAN protocol allows large periods of time with no data being available on the bus (quiet period). Hence, no edges for a system clock synchronization are available during such period of time for clock and data recovery (CDR) purposes.

However, after a large quiet period, it is required to provide a fast synchronization at a RD transition in order to correctly detect the present and following symbols. In order to achieve this result, current approaches utilize massive oversampling concepts of the incoming data stream.

A disadvantage of such high oversampling solution is a high-precision, free running and high frequency clock source. Such high frequency clock may run at clock rates in a range of, e.g., 40 MHz to 80 MHz or even higher. This leads to a significant amount of current consumption, which may exceed predefined current limitations. For example, according to an ISO specification, in a selective wake mode the current is limited to 500 µA. Such restriction can hardly be met by a high frequency clock or it leads to an expensive and complex system.

Another disadvantage of the high frequency clock is that a high precision oscillator as such is a technically challenging and costly component. Hence, there are several contravening objectives, e.g. limited or little current consumption, (cost-)efficient design, available space, limited complexity, that cannot be effectively met by existing solutions.

The examples presented herein offer a solution for symbol synchronization in a CAN environment, which may utilize, also during a partial network mode (i.e. a selective wake mode), a reference clock source of low frequency. The reference clock source may in particular be a free running and low frequency reference clock source (oscillator) for symbol synchronization. The clock source may have a high precision, in particular a precision as high as required for the respective use case scenario.

Hence, there is no need for a costly and complex high frequency and high precision reference clock in partial network mode. As an example, the clock source of low frequency may be in the range below 10 MHz and a cost-inefficient oscillator running at, e.g., 40 MHz or 80 MHz may no longer be required.

The examples suggested herein may be used for symbol synchronization in a high-speed CAN transceiver.

The examples may utilize a delay-locked loop (DLL) unit to provide multiple low frequency clock phases, which are generated based on a (low) frequency reference oscillator. The oscillator may provide a predetermined precision according to the particular use-case scenario. It is noted that a low-frequency oscillator running with high precision could be implemented in a more efficient manner than a high-frequency oscillator providing the same precision.

The DLL unit may supply n equidistant clock phases that are used to determine the RD transition for symbol synchronization of a received CAN message. Then, a sampling phase ϕ may be determined, selected and supplied to a digital protocol handler module.

FIG. 1 shows a block diagram of a circuitry 100 that may be used for symbol synchronization in a CAN selective wake environment. An oscillator 101 supplies a clock signal to a frequency dividing unit 102.

The oscillator 101 may be an RC oscillator, i.e. an oscillator circuit utilizing an RC network (comprising a combination of at least one resistor and at least one capacitor). The clock signal provided by the oscillator 101 may have a frequency of, e.g., 4 MHz.

The frequency dividing unit 102 may be set according to a predefined bus data rate based on the frequency f of the clock signal, i.e. f/n, with n being, e.g., $2^3$.

The output of the frequency dividing unit 102 is connected to a DLL unit 103. The DLL unit 103 supplies n equidistant output phases $\phi_i$ (with i=0 to n−1) 108 to a synchronization and bit timing logic 104 (hereinafter referred to as "logic 104"). Also, a data signal 107 (e.g., a transmission received over the CAN bus system) is conveyed to the logic 104.

The logic 104, detects and selects a suitable phase out of the phases 108 for the RD transition in the data signal 107. This phase is then addressed via a multiplexing unit 105, which is controlled by the logic 104 (see connection 109). The multiplexing unit 105 supplies the phase used for synchronization at an output 110.

The phase at the output 110 and the data signal 107 are conveyed to a CAN selective wake protocol handler module 106, which may supply a wake up signal (not shown in FIG. 1). This wake-up signal can be used for further processing in this or in a separate circuitry.

As an option, the circuitry 100 may be part of a single chip (e.g., die, piece of silicon) or it may be distributed across several chips or components.

Via a signal 111 that is fed to the frequency dividing unit 102 and to the DLL unit 103, the data rate can be selected; for that reason, the signal 111 may comprise at least one, in particular several, bits.

The output of the frequency dividing unit 102 is further connected to a phase-detection unit 112. The output of the phase-detection unit 112 supplies two signals 114 and 115 to a charge pump 113. The charge pump 113 may also comprise a loop filter (e.g., a low-pass filter).

The two signals 114 and 115 of the phase-detection unit 112 are a criterion, e.g., a quantity, for a phase shift $\Delta\phi$ at its inputs. The charge pump 113 provides the functionality of an integrator within the control loop and provides a time constant for the circuitry.

An output 116 of the charge pump 113 conveys a control signal to the DLL unit 103. The output of the phase-detection unit 112 also depends on a phase output signal 117 of the DLL unit 103 that is conveyed to the input of the phase-detection unit 112. Hence, the two inputs of the phase-detection unit 112 (i.e. the output from the frequency dividing unit 102 and the output 117) provide the phase shift $\Delta\phi$ that is converted by the phase-detection unit 112 and the charge pump 113 into the control signal at the output 116.

A schematic and exemplary implementation of the logic 104 could be as follows: The logic 104 processes the data signal 107 via an inverter 118 by a sequence of D-Flip-Flops 119. There are preferably as many D-Flip-Flops 119 as there are output phases $\phi_i$ 108 and each output phase 108 is connected to a D input of a separate D-Flip-Flop 119. The data signal 107 is conveyed to the clock input of all D-Flip-Flops 119. The Q outputs of the D-Flip-Flops 119 are connected to a select logic 120 and further to a calculation logic 121 and the outputs of the calculation logic 121 are connected to a set of D-Flip-Flops 122, wherein the clock of the D-Flip-Flops 122 are connected via a delay element 123 to the clock inputs of the D-Flip-Flops 119. The Q outputs of the D-Flip-Flops 122 control the multiplexing unit 105 via the connection 109. An offset can be adjusted via a signal 124 that is conveyed to the calculation logic 121.

The approach presented has the advantage that it may utilize an oscillator running at low frequency compared to a significant higher frequency that would otherwise be required for oversampling purposes. Another advantage is that no phase-locked loop is required. According to the examples presented, current consumption is reduced compared to a solution with an oscillator operative at a considerably higher frequency. This is in particular beneficial for high-speed CAN transceiver products with a partial networking feature, e.g., a selective wake mode, which may have a current limit (e.g., 500 µA). Also, the approach allows for symbol synchronization within a single unit interval (UI), i.e. a duration of one symbol. In addition to such hard synchronization, also soft synchronization is feasible, which may support a step-wise adjustment of the synchronization.

Figure 2:
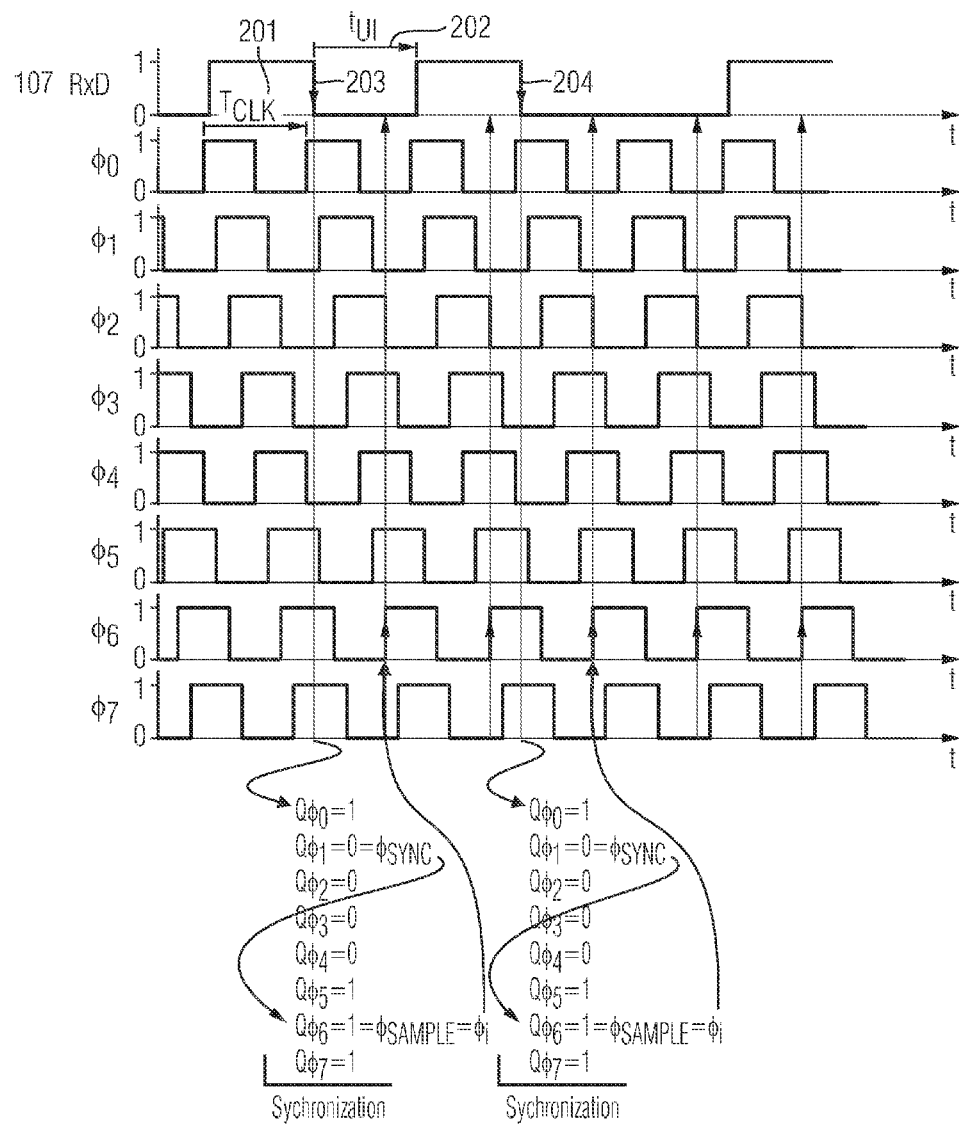
FIG. 2 shows a timing diagram to exemplarily visualize a synchronization based on several phase-shifted signals.

FIG. 2 shows a timing diagram to exemplarily visualize a synchronization based on several phase-shifted signals. For that purpose, FIG. 2 shows the data signal 107 and eight output phases $\phi_i$, i.e. $\phi_0$ to $\phi_7$. The output phases $\phi_i$ are equidistant to each other and are provided by the DLL unit 103. Each of the output phases $\phi_i$ is based on a clock rate 201 that is supplied via the frequency dividing unit 102 such that the clock rate 201 equals a unit interval $t_{ui}$ 202 of the data signal 107. In the example shown in FIG. 2, the data signal 107 comprises two RD transitions (recessive to dominant transitions) 203 and 204.

The DLL unit 103 may be locked to 27c; the clock period of the DLL unit 103 may equal $1/t_{ui}$.

In a first step, the logic 104 detects the RD transition 203 and determines a synchronization phase $\phi_{SYNC}$. In the current example, during synchronization the phase $\phi_1$ is selected, which is the first phase $\phi_i$ which is logical "0" at the RD transition 203.

In a second step, a sampling point is determined considering predefined offsets and alignments. The predefined offset may determine the sampling time within a symbol, i.e. the moment in time when sampling and/or evaluation is performed. An exemplary offset may be the middle of the first half of the unit interval (UI) or within the second half, e.g., at 80% of the UI. The predefined alignment may determine whether post-sampling may be conducted in a "hard" or in a "soft" way, i.e. it may determine a difference or width to the previously used sampling phase $\phi_{SAMPLE}$.

In the current example, the phase $\phi_6$ is selected as sampling phase $\phi_{SAMPLE}$. Theoretically, any of the phases $\phi_1$ to $\phi_7$ could be used as sampling phase $\phi_{SAMPLE}$. In this example the phase $\phi_6$ is selected, because it is in the second half of the "0" interval after the RD transition 203 of the data signal 107.

In a third step, the multiplexing unit 105 selects the sampling phase <PsAMPLE for the CAN selective wake protocol handler module 106 to sample the data signal 107.

Advantageously, two synchronization steps may be conducted on every received RD-transition 203 and 204. In the example shown in FIG. 2, the second synchronization steps produces the same result, i.e. select the phase $\phi_6$ as sampling phase $\phi_{SAMPLE}$.

The synchronization may be conducted as a hard synchronization making a decision on the sampling phase within a single unit interval. Also, a soft synchronization may be conducted by gradually adjusting the sampling phase based on a predefined adjustment step-size.

The examples suggested herein may in particular be based on at least one of the following solutions. In particular combinations of the following features could be utilized in order to reach a desired result. The features of the method could be combined with any feature(s) of the device, apparatus or system or vice versa.

A method is provided for synchronizing a data signal in a bus environment, the method comprising the steps:
   providing multiple clock phases based on a reference oscillator;
   determining a phase out of the multiple clock phases for a transition of a data signal;
   synchronizing the data signal based on the phase determined.

The bus environment may be a CAN bus or a FlexRay bus. The reference oscillator may preferably run at a low frequency compared to approaches that would otherwise utilize oversampling via high frequencies. A suitable phase out of the multiple clock phases is selected and used for synchronizing and optionally decoding the data signal.

Another advantage of this approach is that no frequency multiplying phase-locked-loop is required when having only a low frequency clock source in the system. Also, current consumption can be reduced compared to solutions that require oscillators operative at a considerably higher frequencies. The solution further allows for symbol synchronization within a single unit interval (UI), i.e. a duration of one symbol. Hence, said data signal may in particular be a symbol, i.e. a piece of information that is conveyed (or received) within a predefined time duration (e.g., unit interval).

In an embodiment, the method comprises the step:
   providing multiple clock phases based on a reference oscillator via a delay unit, in particular a delay-locked loop unit.

In an embodiment, the method comprises the step:
   providing equidistant multiple clock phases based on a reference oscillator via a delay-locked loop unit.

In an embodiment, the transition is a recessive-to-dominant transition.

The recessive-to-dominant (RD) transition may be a transition from logical "1" to logical "0". Of course, any transition, also from logical "0" to "1" can be used in combination with the current approach.

In an embodiment, the data signal is part of a received data stream on a CAN bus.

In an embodiment, the method comprises the step:
   determining a wake-up signal based on the synchronized data signal.

The wake-up signal may be a signal that triggers a transition from a standby-mode (or sleep-mode) into an active operation mode. It is noted that the wake-up signal may be determined based on the synchronized and decoded data signal (e.g., incoming signal).

In an embodiment, the method comprises the step:
   determining the phase out of the multiple clock phases for the transition of the data signal based on a predefined offset and/or based on an alignment.

The predetermined offset and/or the alignment may determine a duration after the transition, in particular the RD transition.

In an embodiment, the method comprises the steps:
   determining a synchronization phase out of the multiple clock phases for the transition of the data signal;
   determining a sampling point based on a predefined offset and/or based on an alignment;
   selecting the phase out of the multiple clock phases based on the sampling point.

In an embodiment, the multiple clock phases have the same frequencies.

In an embodiment, the multiple clock phases have the same frequency as the frequency of the reference oscillator.

In an embodiment, the multiple clock phases have a lower frequency as the frequency of the reference oscillator.

In an embodiment, the frequency of the reference oscillator has a frequency of 20 MHz or below.

In an embodiment, the frequency of the reference oscillator has a frequency of 5 MHz or below.

A device is suggested, said device comprising a processing unit that is arranged for
   providing multiple clock phases based on a reference oscillator;
   determining a phase out of the multiple clock phases for a transition of a data signal;
   synchronizing the data signal based on the phase determined.

Said processing unit may be or comprise any control device, logic, die, chip or circuitry that allows providing the required output signals based on the inputs signals.

In an embodiment, the device is a bus controller or part of a bus controller.

In an embodiment, the device is integrated on a single chip or die, in particular in an integrated circuit or on a piece of silicon.

Also, a system is provided, the device comprising
   means for providing multiple clock phases based on a reference oscillator;
   means for determining a phase out of the multiple clock phases for a transition of a data signal;
   means for synchronizing the data signal based on the phase determined.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for synchronizing a data signal in a bus environment, the method comprising:
   providing multiple clock phases based on a reference oscillator, wherein a frequency of the references oscillator is 20 MHz or below;
   selecting a phase from the multiple clock phases for a transition of a data signal as a sampling phase; and
   synchronizing the data signal based on the sampling phase, wherein the data signal is a received message on a controller area network (CAN) bus.

2. The method according to claim 1, further comprising:
   providing multiple clock phases based on a reference oscillator via a delay unit.

3. The method according to claim 2, wherein the delay unit is a delay-locked loop unit.

4. The method according to claim 1, further comprising:
   providing equidistant multiple clock phases based on a reference oscillator via a delay-locked loop unit.

5. The method according to claim 1, wherein the transition is a recessive-to-dominant transition.

6. The method according to claim 1, further comprising:
   determining a wake-up signal based on the synchronized data signal.

7. The method according to claim 1, further comprising:
   determining the phase from the multiple clock phases for the transition of the data signal based on at least one of a predefined offset and an alignment.

8. The method according to claim 1, further comprising:
   determining a synchronization phase out of the multiple clock phases for the transition of the data signal;
   determining a sampling point based on at least one of a predefined offset and an alignment; and
   selecting the phase out of the multiple clock phases based on the sampling point.

9. The method according to claim 1, wherein the multiple clock phases have a same frequencies.

10. The method according to claim 1, wherein the multiple clock phases have a same frequency as a frequency of the reference oscillator.

11. The method according to claim 1, wherein the multiple clock phases have a lower frequency as a frequency of the reference oscillator.

12. The method according to claim 1, wherein a frequency of the reference oscillator is 5 MHz or below.

13. A device comprising a processing unit that is configured to
   provide multiple clock phases based on a reference oscillator, wherein a frequency of the references oscillator is 20 MHz or below;
   select a phase from the multiple clock phases for a transition of a data signal as a sampling phase; and
   synchronize the data signal based on the sampling phase, wherein the data signal is a received message on a controller area network (CAN) bus.

14. The device according to claim 13, wherein the device is a bus controller or part of a bus controller.

15. The device according to claim 13, wherein the device is integrated on a single chip.

16. The device according to claim 13, further comprising a delay-locked loop configured to provide the multiple clock phases.

17. A system comprising:
   means for providing multiple clock phases based on a reference oscillator, wherein a frequency of the references oscillator is 20 MHz or below;
   means for selecting a phase from the multiple clock phases for a transition of a data signal as a sampling phase; and
   means for synchronizing the data signal based on the sampling phase, wherein the data signal is a received message on a controller area network (CAN) bus.

* * * * *